US010411305B2

(12) United States Patent
Sudworth et al.

(10) Patent No.: US 10,411,305 B2
(45) Date of Patent: Sep. 10, 2019

(54) CURRENT COLLECTOR DESIGN TO REDUCE GRANULE BED DISRUPTION

(71) Applicant: General Electric Company, Schenectady, NY (US)

(72) Inventors: Paul Sudworth, Ashby-de-la-Zouch (GB); Grzegorz Maruszak, Burton-on-Trent (GB)

(73) Assignee: General Electric Company, Schenectady, NY (US)

( * ) Notice: Subject to any disclaimer, the term of this patent is extended or adjusted under 35 U.S.C. 154(b) by 90 days.

(21) Appl. No.: 15/725,310

(22) Filed: Oct. 5, 2017

(65) Prior Publication Data

US 2018/0034110 A1    Feb. 1, 2018

Related U.S. Application Data

(62) Division of application No. 14/718,146, filed on May 21, 2015, now Pat. No. 9,786,956.

(51) Int. Cl.
*H01M 10/39* (2006.01)
*H01M 4/66* (2006.01)
*H01M 4/78* (2006.01)

(52) U.S. Cl.
CPC .......... *H01M 10/399* (2013.01); *H01M 4/661* (2013.01); *H01M 4/78* (2013.01); *H01M 2300/0048* (2013.01)

(58) Field of Classification Search
CPC ...... H01M 10/399; H01M 4/661; H01M 4/78; H01M 2300/0048
See application file for complete search history.

(56) References Cited

U.S. PATENT DOCUMENTS

| | | |
|---|---|---|
| 5,972,533 A | 10/1999 | Coetzer et al. |
| 8,603,671 B2 | 12/2013 | Bogdan, Jr. et al. |
| 2014/0038038 A1 | 2/2014 | Vallance et al. |
| 2015/0004456 A1 | 1/2015 | Galloway et al. |

*Primary Examiner* — Gregg Cantelmo
(74) *Attorney, Agent, or Firm* — Dority & Manning, P.A.

(57) ABSTRACT

Apparatus and methods to reduce granule disruption during manufacture of electrochemical cells, such as a metal halide electrochemical cell, are provided. In one embodiment, a current collector can include a diffuser strip extending beneath an aperture configured to receive an injection stream of molten electrolyte. The diffuser strip can be configured to dissipate an injection stream of molten electrolyte when the molten electrolyte is injected into an electrochemical cell. In this way, disruption of a granule bed by the injection of the molten electrolyte during manufacture of the electrochemical cell can be reduced.

5 Claims, 4 Drawing Sheets

CURRENT COLLECTOR DESIGN TO REDUCE GRANULE BED DISRUPTION

PRIORITY CLAIM

The present application is a divisional of U.S. application Ser. No. 14/718,146, having a filing date of May 21, 2015, and corresponding U.S. Pat. No. 9,786,956, having an issue date of Oct. 10, 2017. Applicants claim priority to and benefit of all such applications and incorporate all such applications herein by reference.

FIELD OF THE INVENTION

The present subject matter relates generally to electrochemical cells used in energy storage devices, and more particularly to a current collector design for electrochemical cells in energy storage devices.

BACKGROUND OF THE INVENTION

Metal halide electrochemical cells, such as sodium-metal chloride batteries, can include a molten metal negative electrode (usually referred to as the anode) and a beta-alumina solid electrolyte. Metal halide electrochemical cells can be of considerable interest for energy storage applications. In addition to the anode, the cell can include a positive electrode (usually referred to as a cathode) that supplies/receives electrons during charging and discharging of the cell. The cathode composition can include a mixture of electroactive metal and alkali metal halide, which may be combined in the form of granules. The cathode composition may be infused with a molten electrolyte.

During manufacture of the electrochemical cells, the molten electrolyte can be injected into the cathode portion of the electrochemical cells through a suitable opening or aperture onto a granule bed. The high velocity of the molten electrolyte being injected into the cathode portion of the electrochemical cells can cause a disturbance in the top surface of the granule bed of the cathode, which can lead to reductions in charge/discharge capacity, charge time, and cell resistance for the electrochemical cell. In addition, in some cases, not all electrochemical cells in an array of electrochemical cells (e.g. used in a battery) are affected uniformly by the granule bed disturbance. This can cause cell to cell variation in performance in the array where underperforming cells are put under stress by better performing cells. The stressing of the weaker cells can lead to early cell failures in the array.

BRIEF DESCRIPTION OF THE INVENTION

Aspects and advantages of embodiments of the present disclosure will be set forth in part in the following description, or may be learned from the description, or may be learned through practice of the embodiments.

One example aspect of the present disclosure is directed to an electrochemical cell. The electrochemical cell can include a separator having a first surface that defines at least a portion of a first compartment and a second surface that defines at least a portion of a second compartment. The electrochemical cell can include a positive electrode composition disposed in the first compartment. The positive electrode composition can include a granule bed and at least one electrolyte. The electrochemical cell can further include a current collector disposed in the first compartment such that at least a portion of the current collector extends into the positive electrode composition. The current collector can include a diffuser strip. The diffuser strip can be configured to dissipate an injection stream of molten electrolyte into the first compartment when the molten electrolyte is injected into the first compartment.

Another example aspect of the present disclosure is directed to a current collector for an electrochemical cell. The current collector can include a cap having an aperture. The aperture can be configured to receive an injection stream of molten electrolyte. The current collector can include a first surface extending from the cap and a second surface extending from the cap. The first surface can be separated from the second surface by a distance. The current collector can include a diffuser strip disposed between the first surface and the second surface. The diffuser strip extends beneath the aperture configured to receive the injection stream of molten electrolyte.

Yet another example aspect of the present disclosure is directed to a method for manufacturing an electrochemical cell. The method can include disposing a separator in a housing. The separator has a first surface that defines at least a portion of a first compartment in the housing and a second surface that defines at least a portion of a second compartment in the housing. The method can include disposing a current collector in the first compartment such that at least a portion of the current collector extends into the positive electrode composition. The current collector has a first surface and a second surface separated by a distance. The current collector can include a diffuser strip arranged between a first surface and the second surface. The method can include injecting a molten electrolyte into the first compartment. The diffuser strip can be arranged to dissipate an injection stream of the molten electrolyte so that disruption of the granule bed by the injection stream is reduced.

Variations and modifications can be made to these example aspects of the present disclosure.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION OF THE INVENTION

Figure 1:
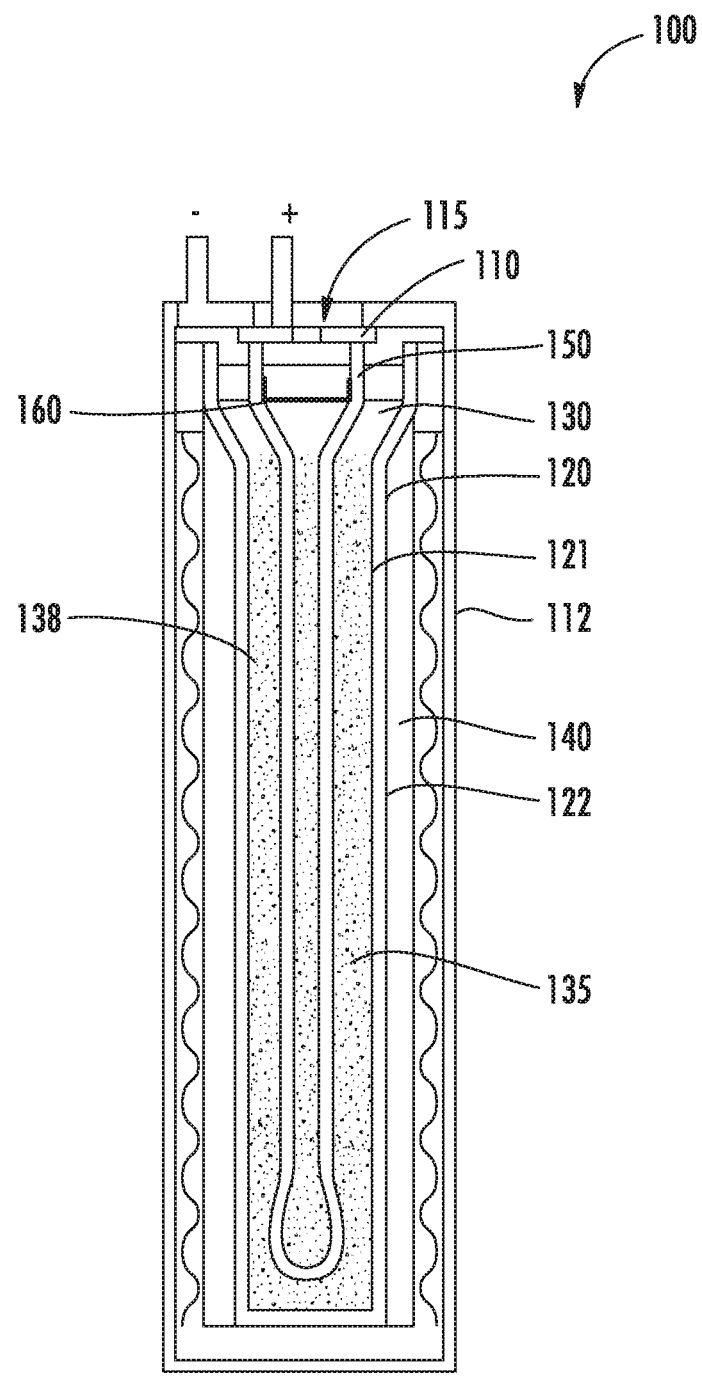
FIG. 1 depicts an electrochemical cell according to example embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Example aspects of the present disclosure are directed to a current collector design to reduce granule disruption during manufacture of electrochemical cells, such as a metal halide electrochemical cell. In one embodiment, the current collector can include a diffuser strip that is configured to dissipate an injection stream of molten electrolyte when the molten electrolyte is injected into the electrochemical cell. In this way, disruption of a granule bed by the injection of the molten electrolyte during manufacture of the electrochemical cell can be reduced. This can lead to increased uniformity in electrochemical cell performance in arrays of electrochemical cells (e.g. a battery energy storage device), resulting in improved performance of the energy storage device.

For example, in one embodiment, an electrochemical cell can include a housing having a separator. The separator can have a first surface defining at least a portion of a first compartment of the electrochemical cell and a second surface defining at least a portion of a second compartment of the electrochemical cell. A positive electrode composition can be disposed within the first compartment. An anode composition can be disposed within the second compartment. Ions can traverse between the first compartment and the second compartment through the separator.

During manufacture of the electrochemical cell, a granule bed having a plurality of granules can be disposed within the first compartment. One or more of the plurality of granules can include a mixture of an electroactive metal and an alkali metal halide. A current collector can be disposed within first compartment such that at least a portion of the current collector extends into the positive electrode composition. An electrolyte can be injected into the first compartment by providing an injection stream through an aperture defined in the current collector, housing, or other suitable portion of the electrochemical cell. The injection stream can cause disruption in the granule bed, leading to degradation of performance of the electrochemical cell. According to example aspects of the present disclosure, the current collector can include a diffuser strip that dissipates the injection stream during injection of the molten electrolyte.

In one embodiment, the current collector can have a first surface and a second surface, the diffuser strip can extend between the first surface and the second surface such that diffuser strip is directly beneath the aperture. As used herein, directly beneath refers to beneath without any intervening structure or material. The diffuser strip can have a width that is greater than a size of the aperture to facilitate dissipation of the injection stream. In one example embodiment, the current collector is a U-shaped current collector having a first leg and a second leg. The diffuser strip extends between the first leg and the second leg directly beneath the aperture for injecting the molten electrolyte into the electrochemical cell.

FIG. 1 depicts a front cross-sectional view of an electrochemical cell 100. In some embodiments, the electrochemical cell includes a housing 112. An elongated ion-conducting separator 120 is further disposed inside the housing 112. The separator 120 has a first surface 121 that defines at least a portion of a first compartment 130 (for example, a positive electrode compartment). The separator has a second surface 122 that defines a portion of a second compartment 140 (for example, an anode compartment).

FIG. 1 depicts embodiments wherein the first compartment 130 is disposed within the second compartment 140. In such instances, the positive electrode compartment 130 is disposed within the anode compartment 140. In some other embodiments, the second compartment 140 can be disposed within the first compartment 130. In such instances, the anode compartment 140 is disposed within the positive electrode compartment 130.

Referring to FIG. 1, in some embodiments, the housing 112 of the electrochemical cell may be sized and shaped, for instance, to have a cross-sectional profile that is square, polygonal, or circular. The housing may be formed from a material including a metal, ceramic, a composite, or combinations thereof. In some embodiments, a suitable metal may include nickel, iron, molybdenum, or steel.

As noted above, the separator 120 can be disposed within the volume of the housing 112. In some embodiments, the separator 120 may be sized and shaped to have a cross-sectional profile configured to provide a maximum surface area for alkali metal ion transport. In some embodiments, the separator includes a shape with a cross-sectional profile that may, for instance, be an ellipse, a triangle, a cross, a star, a circle, a cloverleaf, a rectangle, a square, a polygon, a multi-lobe, or combinations thereof.

In some embodiments, the separator 120 is a solid separator. In some embodiments, the solid separator includes an alkali metal ion conductor solid electrolyte capable of transporting alkali metal ions between the first compartment and the second compartment. Suitable materials for the solid separator may include an alkali-metal-beta-alumina, alkali-metal-beta"-alumina, alkali-metal-beta'-gallate, or alkali-metal-beta"-gallate. In some embodiments, the solid separator may include a beta-alumina, a beta"-alumina, a gamma alumina, or a micromolecular sieve such as, for example, a tectosilicate, such as a feldspar, or a feldspathoid. Other example separator materials include zeolites, for example a synthetic zeolite such as zeolite 3 A, 4 A, 13×, ZSM-5; rare-earth silicophosphates; silicon nitride; beta'-alumina; beta"-alumina; gamma alumina; a micromolecular sieve; or a silicophosphate (NASICON: $Na_3Zr_2Si_2PO_{12}$).

In some embodiments, the separator 120 may be stabilized by the addition of small amounts of a dopant. The dopant may include one or more oxides selected from lithia, magnesia, zinc oxide, and yttria. These stabilizers may be used alone or in combination with themselves, or with other materials.

In some embodiments, the separator 120 includes a beta alumina. In one embodiment, a portion of the separator 120 is alpha alumina, and another portion of the separator 120 is beta alumina. In some embodiments, the alpha alumina (a non-ionic-conductor) may help with sealing and/or fabrication of the energy storage device. In a particular embodiment, the separator 120 includes a beta alumina separator electrolyte (BASE), and may include one or more dopants.

In some embodiments, at least one of the alkali metals in the positive electrode composition may be sodium, and the separator may be beta-alumina. In another embodiment, the alkali metal may be potassium or lithium, with the separator 120 then being selected to be compatible therewith. For example, in embodiments where the ions include potassium, silver, strontium, and barium cations, the separator material may include beta alumina. In certain other embodiments, where lithium cations are used, lithiated borophosphate $BPO_4$—$Li_2O$, may be employed as the separator material.

Referring to FIG. 1, the electrochemical cell 100 includes a positive electrode composition 135 disposed inside the first compartment 130. In some embodiments, the positive electrode composition 135 includes a granule bed 138 of a plurality of granules. One or more of the plurality of granules in the granule bed 138 can include a mixture of at least one electroactive metal and an alkali metal halide. In addition, the positive electrode composition can include a molten electrolyte.

In some embodiments, the electroactive metal is selected from the group consisting of titanium, vanadium, niobium, molybdenum, nickel, cobalt, chromium, manganese, silver, antimony, cadmium, tin, lead, iron, zinc, and combinations thereof. In some specific embodiments, the electroactive metal includes nickel, iron, zinc, cobalt, chromium, or combinations thereof. In particular embodiments, the electroactive metal is nickel. In some embodiments, the positive electrode composition includes at least two electroactive metals. In some embodiments, the at least two electroactive metals include nickel and iron.

In some embodiments, the electroactive metal is substantially free of copper. The term "substantially free" as used herein means that the amount of copper in the positive electrode composition is less than about 1 weight percent. Without being bound by any theory, it is believed, that copper, if present in the positive electrode composition, may sometimes oxidize to form one or both of cuprous (+1) and cupric (+2) ions. These ions may be soluble in the electrolyte, and may therefore be transported to the separator, leading to swelling and fracture of the separator. In some particular embodiments, the amount of copper in the positive electrode composition is less than about 0.01 weight percent.

As noted previously, one or more granules in the positive electrode composition 135 can further include at least one alkali metal halide. In some embodiments, a suitable alkali metal halide includes at least one halide of sodium, potassium, or lithium. In some embodiments, a suitable alkali metal halide includes a chloride, bromide, or fluoride. In some embodiments, the positive electrode composition includes at least one sodium halide, e.g., sodium chloride. In some embodiments, the positive electrode composition includes at least two alkali metal halides. One such example includes sodium chloride and at least one of sodium iodide and sodium fluoride.

In addition to the components discussed above, the positive electrode composition 135 may include a number of other constituents, such as aluminum, sulfer, and/or additives beneficially affect the performance of an electrochemical cell.

In one embodiment, the positive electrode composition 135 is disposed on an electronically conductive support structure. The support structure may not undergo any chemical reaction during the charge/discharge, and may simply support the cathodic material during chemical reactions. The support structure may be in a number of forms, such as a foam, a mesh, a weave, a felt, or a plurality of packed particles, fibers, or whiskers. In one embodiment, a suitable support structure may be formed from carbon or a metal.

In some embodiments, the positive electrode composition 135 further includes an electrolyte. For instance, the positive electrode composition can also be infused with a molten electrolyte. In some embodiments, the molten electrolyte transports the ions from a separator to the positive electrode, and vice-versa. In one embodiment, the molten electrolyte includes a binary salt including an alkali metal halide and aluminum halide. In a specific embodiment, the molten electrolyte is sodium tetrachloroaluminate ($NaAlCl4$). In some embodiments, the molten electrolyte may include one or more additional metal halides, and forms a ternary or quaternary electrolyte. As discussed in more detail below, the molten electrolyte can be injected into the first compartment 130 through an aperture 115 defined by cap 110.

Referring to FIG. 1, the electrochemical cell 100 can further include a second compartment (or anode compartment) 140 comprising an anodic material (not shown). Typically, the anode compartment 140 is empty in the ground state (uncharged state) of the electrochemical cell. The anode compartment 140 is then filled with metal from reduced metal ions that move from the positive electrode compartment 130 to the anode compartment 140 through the separator 120, during operation of the cell. The anode compartment 140 may receive and store a reservoir of the anodic material, in some embodiments. Typically, the anodic material includes an alkali metal. Non-limiting examples of the anodic material may include lithium, sodium, or potassium. The anodic material is usually molten during use. In one embodiment, the anodic material includes sodium.

In some embodiments, the anodic material may include one or more additives. Additives suitable for use in the anodic material may include a metallic oxygen scavenger. Suitable metal oxygen scavengers may include one or more of manganese, vanadium, zirconium, aluminum, or titanium. Other useful additives may include materials that increase wetting of the separator surface defining the anode compartment, by the molten anodic material. Additionally, some additives or coatings may enhance the contact or wetting between the separator and the current collector, to ensure substantially uniform current flow throughout the separator.

Referring still to FIG. 1, the electrochemical cell can include a current collector 150. The current collector 150 can be disposed in the electrochemical cell 100 such that at least a portion of the positive current collector 150 extends into the positive electrode composition 135. Further, the current collector 150 is in electrical communication with the positive electrode composition 135. The current collector 150 depicted in FIG. 1 includes a U-shaped conductor. The current collector 150 can include or be joined with cap 110 (e.g. nickel cap). The cap 110 can include an aperture 115 for injecting a molten electrolyte onto the granule bed 138.

Suitable materials for the current collector 150 can include platinum, palladium, gold, nickel, copper, carbon, titanium, and combinations thereof. The current collector 150 may be plated or clad in some embodiments. In some embodiments, the current collector 150 includes a solid metal conductor. In one embodiment, the current collector 150 is substantially free of iron. In one embodiment, the current collector 150 is substantially free of copper. In a particular embodiment, the current collector 150 includes nickel or copper cored (e.g. composite) material.

As discussed above, the electrochemical cell 100 can be manufactured at least in part by filling the first compartment 130 with a granule bed 138 and injecting the first compartment 130 with a molten electrolyte. According to particular aspects of the present disclosure, the molten electrolyte can be injected through an aperture, such as aperture 115 defined by a cap 110. In some embodiments, the current collector 150 can be joined to cap 110.

According to example embodiments of the present disclosure, the current collector 150 includes a diffuser strip 160. The diffuser strip 160 can be configured to dissipate an injection stream of molten electrolyte as the electrochemical cell 100 is filled with the molten electrolyte. In this way, disruption of the granule bed 138 by injection of the molten electrolyte can be reduced.

Figure 2:
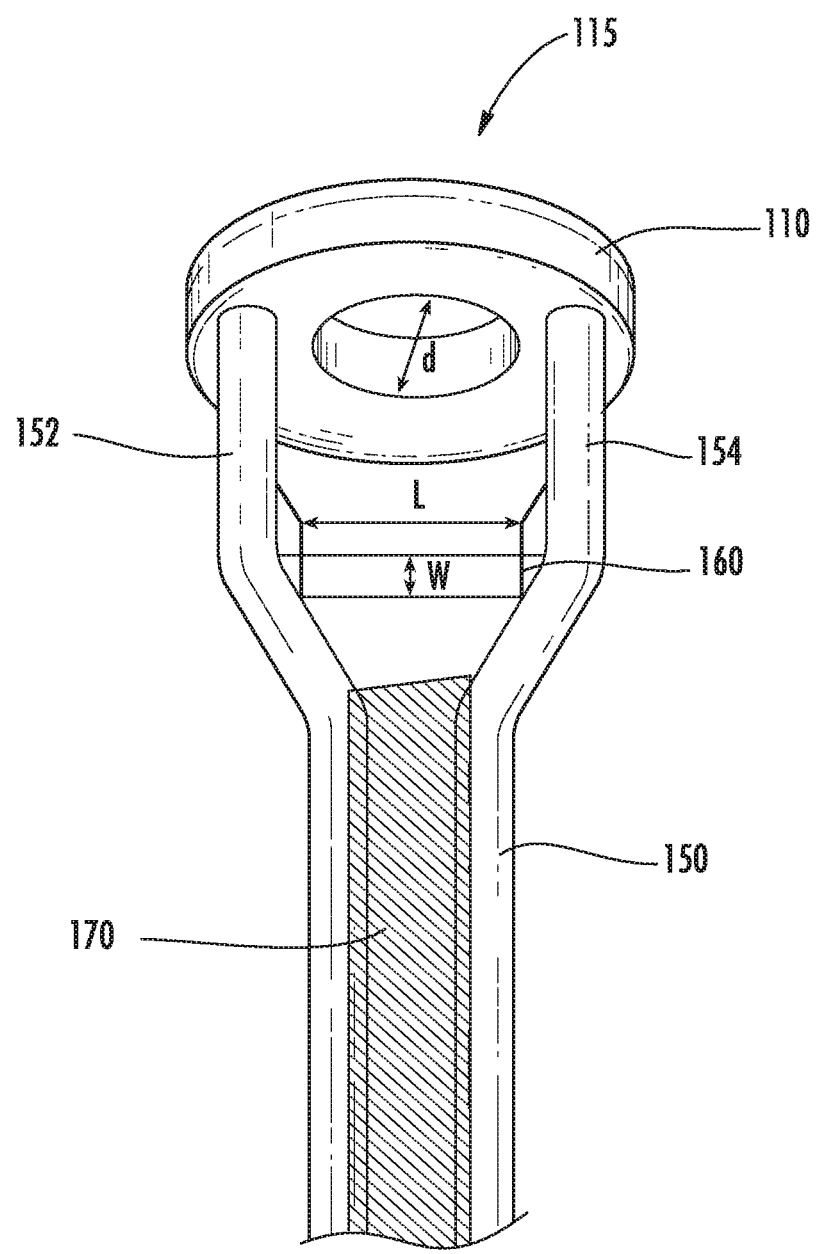
FIG. 2 depicts a perspective view current collector with diffuser strip according to example embodiments of the present disclosure.

FIG. 2 depicts a perspective view of a portion of an example current collector 150 with diffuser strip 160 according to example embodiments of the present disclosure. The current collector 150 can include or be joined to cap 110. The current collector 150 can include a first surface 152 extending from the cap 110 and a second surface 154 extending from the cap 110. The second surface 154 can be separated from the first surface 152 by a distance. In the example of FIG. 2, the current collector 150 can include a U-shaped conductor (bend in U-shape shown in FIG. 1) having a first leg 152 and a second leg 154 separated by a distance. The U-shaped conductor can be a bent solid rod of nickel.

The present disclosure will be discussed with reference to a U-shaped current collector comprising a bent solid rod for purposes of illustration and discussion. Those of ordinary skill in the art, using the disclosures provided herein, will understand that a diffuser strip according to example embodiments of the present disclosure can be used with other suitable current collectors. For instance, the diffuser strip according to example embodiments of the present disclosure can be used with a current collector having one or more flat elongated metal fins or other suitable construction.

Referring to FIG. 2, a wicking material 170 can be disposed between the first leg 152 and the second leg 154 of the current collector 150. The wicking material 170 can wick liquid electrolyte upward toward the top of the electrochemical cell 100, keeping granules in the granule bed wet.

A diffuser strip 160 can be disposed between the first leg 152 and the second leg 154. The diffuser strip 160 can be a planar strip that extends directly beneath the aperture 115 of the cap 110. The diffuser strip 160 can be formed from the same material as the current collector 150. In one embodiment, the diffuser strip 160 can be nickel. The diffuser strip 160 joined to the first leg 152 and the second leg 154 by welding or other suitable attachment.

In one embodiment, the diffuser strip 160 can have a length L and a width W. The length dimension L of the diffuser strip 160 can extend between the first leg 152 and the second leg 154 of the current collector 150. The width dimension W can be perpendicular to the length dimension L. In one embodiment, the width dimension W can be larger than a size of the aperture 115 used to inject the electrochemical cell 100 with molten electrolyte. For instance, the width dimension W can be larger than a diameter d of the aperture 115. A diffuser strip 160 having a width W greater than a size of the aperture 115 can be greater than a width of the injection stream received through the aperture, providing increased dissipation of an injection stream of molten electrolyte through aperture 115.

The diffuser strip 160 can be spaced a distance beneath the aperture 115. In one embodiment, there are no intervening structures between the aperture 115 so that the diffuser strip 160 can dissipate the injection stream of molten electrolyte entering the aperture 115. In one embodiment, the diffuser strip 160 is spaced a sufficient distance beneath the aperture 115 to allow the injection stream to enter the first compartment while at the same time dissipating the injection stream to reduce disruption of the granule bed. For instance, in one embodiment, the portion of the diffuser strip 160 extending beneath the aperture can be spaced a distance in the range of 0.5 cm to 4.0 cm from the aperture 115, such as 0.75 cm to 2.0 cm from the aperture 115, such as 1.0 cm from the aperture.

In the embodiment shown in FIG. 2, the diffuser strip 160 is a planer strip extending beneath the aperture 115 of the cap 110. The diffuser strip 160 can have any shape sufficient to cause dissipation of the molten electrolyte as the electrochemical cell is filled with the molten electrolyte without deviating from the scope of the present disclosure. For instance, in one embodiment, the diffuser strip 160 can have a concave surface that bends away from the aperture 115 to facilitate dissipation of the molten electrolyte. In one embodiment, the diffuser strip 160 can have a convex surface to facilitate dissipation of the molten electrolyte.

Figure 3:
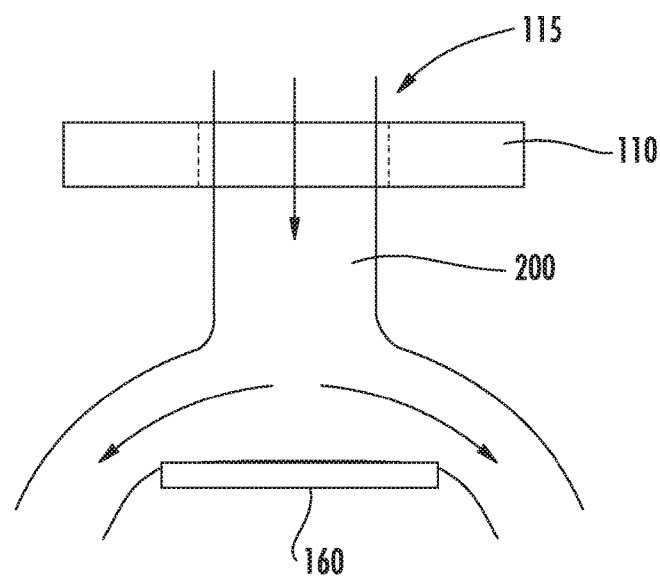
FIG. 3 depicts an example dissipation of an injection stream of molten electrolyte using a diffuser strip according to example embodiments of the present disclosure.

FIG. 3 depicts an example dissipation of an injection stream 200 of molten electrolyte using a diffuser strip according to example embodiments of the present disclosure. As shown, the injection stream 200 is provided through aperture 115 of cap 110 during filling of the electrochemical cell with molten electrolyte. As illustrated in the embodiment of FIG. 3, the injection stream 200 is dissipated into different directions by the diffuser strip 160. This can reduce the velocity at which the injection stream 200 contacts the granule bed, leading to reduced disruption of the granule bed during filling of the electrochemical cell with molten electrolyte.

Figures 4, 5:
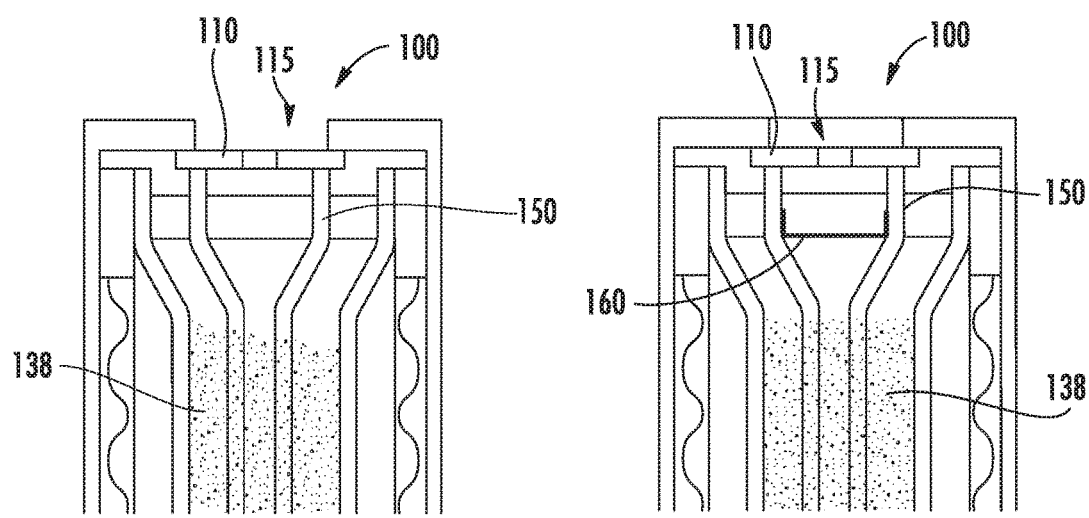
FIGS. 4 and 5 depict an example reduction in granule bed disruption using a diffuser strip according to example embodiments of the present disclosure.

For instance, FIG. 4 depicts an example electrochemical cell 100 having a current collector 150 without a diffuser strip after the electrochemical cell 100 has been filled with molten electrolyte through aperture 115 of cap 110. As shown, the top surface of the granule bed 138 has been disrupted. For instance, the velocity of the injection stream of molten electrolyte may have caused some of the granules of the granule bed to float and settle at random locations, leading to uneven distribution of the granule bed 138 in the electrochemical cell 100.

In contrast, the electrochemical cell 100 of FIG. 5 has a current collector 150 with diffuser strip 160 according to example embodiments of the present disclosure. When an injection stream of molten electrolyte fills the electrochemical cell 100 through aperture 115 in cap 110, the diffuser strip 160 dissipates the injection stream and/or reduces the velocity of the injection stream. This leads to reduced disturbance of the granule bed. As shown in FIG. 5, the disruption in the granule bed 138 is less than the disruption of the granule bed 138 depicted in FIG. 4. In this way, the diffuser strip 160 can lead to improved performance of electrochemical cells.

Figure 6:
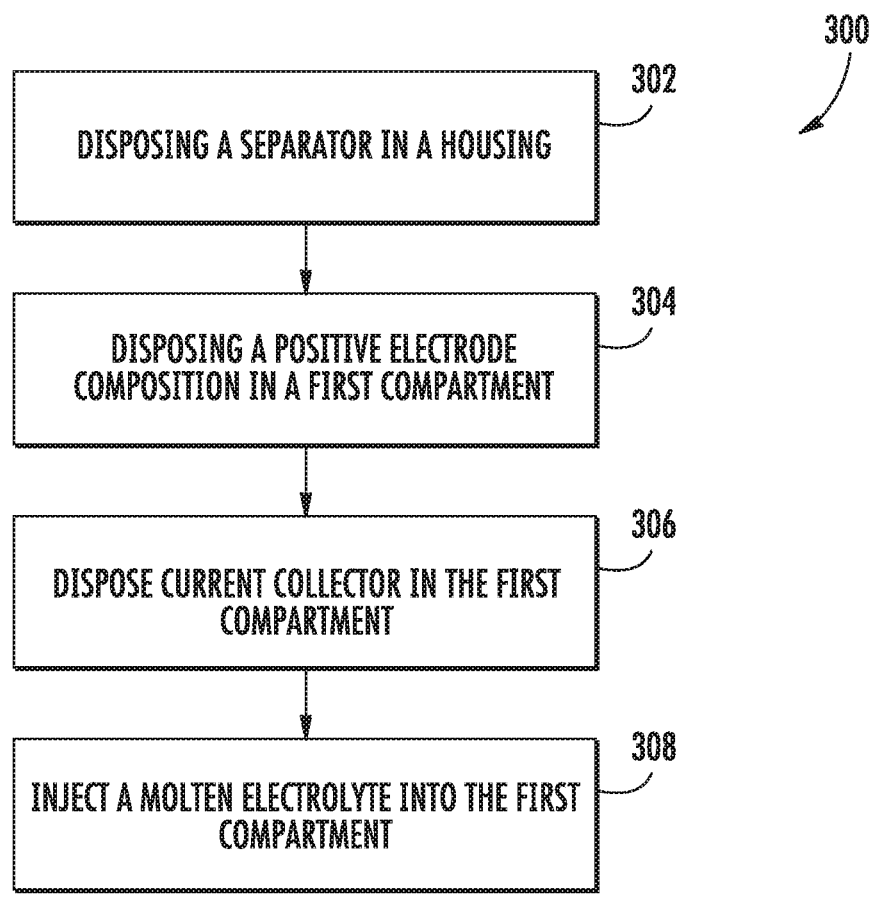
FIG. 6 depicts a flow diagram of an example method for manufacturing an electrochemical cell according to example embodiments of the present disclosure.

FIG. 6 depicts a flow diagram of an example method (300) for filling an electrochemical cell with a positive electrode composition according to example embodiments of the present disclosure. FIG. 6 depicts steps performed in a particular order for purposes of illustration and discussion. Those of ordinary skill in the art, using the disclosures provided herein, will understand that the various steps of any of the methods disclosed herein can be adapted, modified, expanded, omitted, or rearranged in various ways without deviating from the scope of the present disclosure.

At (302), the method includes disposing a separator in a housing. For instance, in one embodiment, the separator 120 can be disposed in the housing 112 of the electrochemical cell of FIG. 1. The separator can have a first surface that defines at least a portion of a first compartment in the housing. The separator can also have a second surface that defines at least a portion of a second compartment in the housing.

At (304), the method includes disposing a positive electrode composition in the first compartment. The positive electrode composition includes a granule bed. The granule bed can include a plurality of granules. One or more of the plurality of granules can include an electroactive metal and an alkali metal halide.

At (306), a current collector is disposed in the first compartment such that the current collector extends into the granule bed. The current collector can include a first surface and a second surface separated by a distance. For instance, in one embodiment, the current collector comprises a U-shaped conductor having a first leg and a second leg, such as the current collector 150 of FIGS. 1-2.

According to example aspects of the present disclosure, the current collector can further include a diffuser strip extending between the first surface and the second surface. In one embodiment, the diffuser strip can be arranged directly beneath an aperture for filling the first compartment with molten electrolyte. In one embodiment, the diffuser strip can have a width that is greater than a size of the aperture. One example diffuser strip is diffuser strip 160 depicted in FIGS. 1-5.

Referring to FIG. 6 at (604), the method includes injecting a molten electrolyte in to the first compartment. For instance, a molten electrolyte can be injected into the first compartment through an aperture. As discussed in more detail able, the diffuser strip can dissipate an injection stream of the molten electrolyte so that disruption of the granule bed by the injection stream is reduced.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for manufacturing an electrochemical cell, comprising:
    disposing a separator in a housing, wherein the separator has a first surface that defines at least a portion of a first compartment in the housing and a second surface that defines at least a portion of a second compartment in the housing;
    disposing a positive electrode composition in the first compartment, the positive electrode composition comprising a granule bed;
    disposing a current collector in the first compartment such that at least a portion of the current collector extends into the granule bed, the current collector comprising a cap, a first surface, a second surface separated from the first surface by a distance, and a diffuser strip, the first surface extending from the cap and comprising a first leg of a U-shaped conductor, the second surface extending from the cap and comprising a second leg of the U-shaped conductor, the diffuser strip extending between the first leg and the second leg;
    injecting a molten electrolyte into the first compartment;
    wherein the diffuser strip is arranged to dissipate an injection stream of the molten electrolyte so that disruption of the granule bed by the injection stream is reduced.

2. The method of claim 1, wherein injecting the molten electrolyte into the first compartment comprises injecting the molten electrolyte into an aperture defined by the cap.

3. The method of claim 2, wherein the diffuser strip is arranged directly beneath the aperture.

4. The method of claim 2, wherein the diffuser strip has a width that is greater than a width of the injection stream.

5. The method of claim 2, further comprising dissipating, by the diffuser strip, the molten electrolyte received in the aperture.

* * * * *